H. BAKER.
Hay Raker and Loader.
No. 3,854. Reissued March 1, 1870.
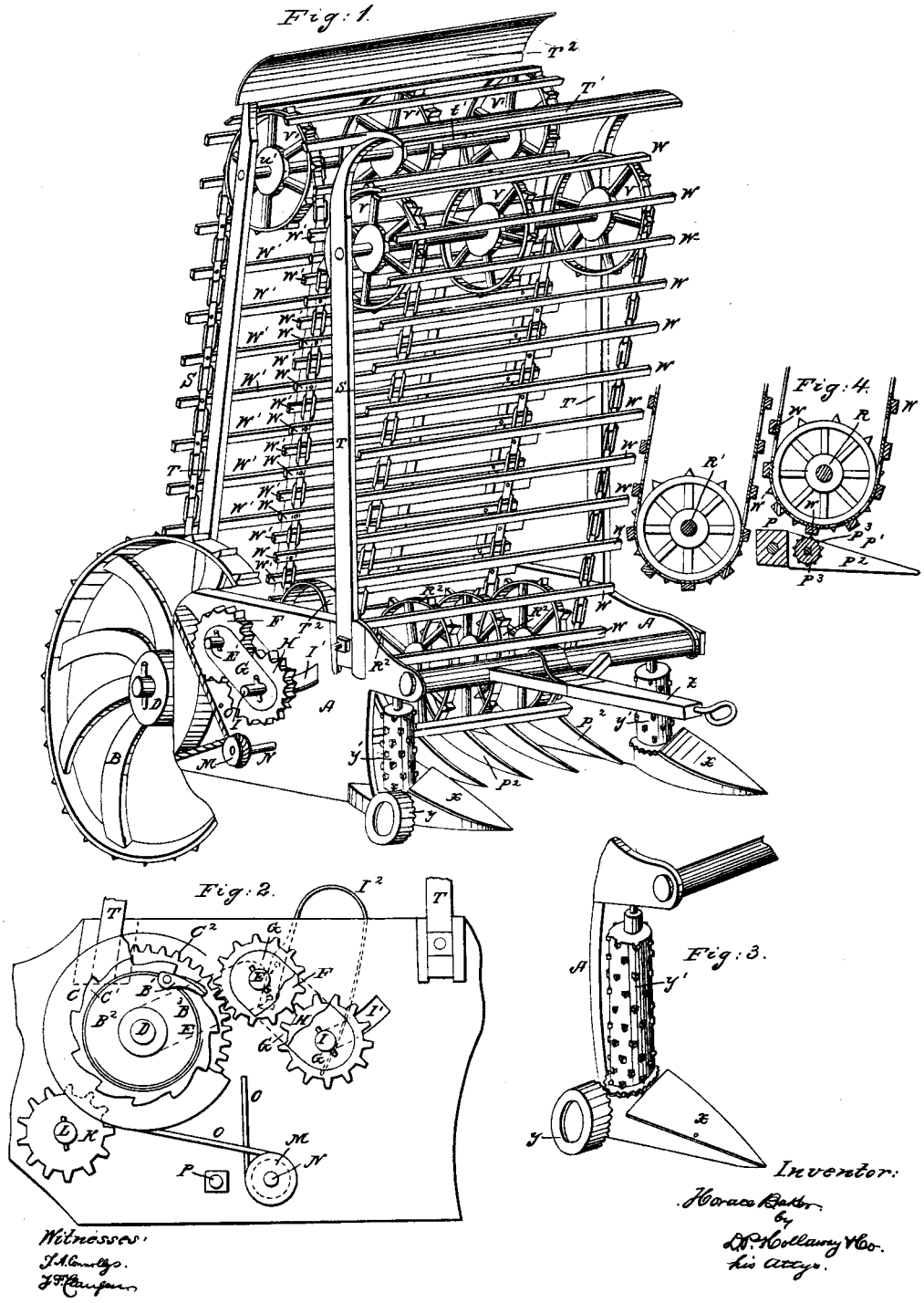
N. PETERS, Photo-Lithographer, Washington, D. C.

United States Patent Office.

HORACE BAKER, OF CORTLAND, ASSIGNOR TO RICHARD K. SANFORD, OF VOLNEY, NEW YORK.

*Letters Patent No.* 55,979, *dated July* 3, 1866; *reissue No.* 2,911, *dated April* 7, 1868; *reissue No.* 3,854, *dated March* 1, 1870.

HAY-RAKER AND LOADER

The Schedule referred to in these Letters Patent and making part of the same.

*To all whom it may concern:*

Be it known that I, HORACE BAKER, of Cortland, in the county of Cortland, and State of New York, have invented an Improved Machine for Loading Hay and Grain; and I do hereby declare that the following is a full and exact description thereof, reference being had to the accompanying drawings making part of this specification—

Figure 1 being a view in perspective of the complete machine.

Figure 2, a side elevation of the lower frame-work and gearing of the machine.

Figure 3, a view in perspective of a portion of the machine detached.

Figure 4, a vertical section of another portion of the machine.

Like letters designate corresponding parts in all of the figures.

The main and essential feature of my invention consists in the employment of two or more continuous or "endless" aprons, arranged together and co-operating in such a manner as both to take up from the ground and then elevate or convey the hay, grain, or other substance between them, to the wagon or cart, as hereinafter specified.

In connection with this principal feature, I employ other useful auxiliary devices, which, in their proper relations to the endless aprons, I will also herein set forth.

The co-operating endless aprons are situated and actuated in planes opposite to and parallel, or nearly parallel, with each other, at distances apart sufficient to admit, without unnecessary compression, such a quantity of hay or grain as may be presented to them at any time; in which positions they have (one or both) a yielding, elastic, self-adjusting movement toward and from each other, independent at the several extremities and edges, to adapt them to the variable quantities of hay or grain received successively, or at different parts. Their motions are, at their receiving or seizing extremities, toward each other, at their adjacent plane surfaces or parts, in the same or parallel directions; and at their delivering-extremities outward from each other. The motions of both are positive, and their speeds are equal, or nearly so. Their longitudinal dimensions are not equal, or co-extensive. At their lower or receiving-extremities, one is elevated sufficiently to pass over the hay or grain to be taken up; and the other extends downward far enough to seize hold of and take up the hay from the ground. Also at their upper or delivery extremities, one extends beyond the other when the hay or grain is delivered laterally therefrom. They are, or one of them is, most properly made with open surfaces, as with simple cross-slats, so as to seize and better hold the hay or grain in contact therewith, without the aid of teeth, or other obstructing projections.

Thus, by one of the aprons extended downward, the hay or grain is seized; by the mutually-approaching motions of the two, at the bottom, it is taken up; by their elastic compression, it is retained between them; by their parallel and equal progressive motions, it is elevated or conveyed to the place required; and by their separating motions at the top, it is freely discharged.

A suitable main frame, A, in and upon which the working parts of the machine are mounted, is supported by two wheels, B B, whose revolutions, as they travel on the ground, communicate the required movements to the operative parts.

The machine is drawn by means of a tongue or pole, Z, which is conveniently attached to the axle of the cart or wagon, closely behind which it moves for loading the same.

The endless aprons are constructed each of two endless chains or bands, S S or S′ S′, connected transversely by slats W W or W′ W′.

The chains, respectively at the bottom and top, pass round rag-wheels R V or R′ V′ secured upon shafts I *u* or L *u′*; the lower shafts I L having their bearings in the frame A, and the upper shafts *u u′* being mounted in standards T T, which extend upward from the said frame.

In the construction of the endless chains, it is proper to make the alternate links open, so as to fit over pyramidal or other equivalent form of projections on the peripheries of the rag-wheels, for rendering the motions of the chains positive and uniform, and to make the intermediate links of merely perforated plates, to which the cross-slats may be riveted.

There may be between each pair of rag-wheels upon their shaft, and equal or nearly equal to them in diameter, a wheel or disk, $R^2$, one or more, in order to sustain the cross-slats, that they may not yield and bend to the pressure of the hay or grain as they pass around the said rag-wheels.

For the purpose of giving the elastic self-adjustment toward and from each other, to the endless aprons at the top, they are represented as having their supporting standards T T, flexible and elastic. If they are made of suitably elastic wood, or other equivalent material, and of the proper size and form, this result may be well accomplished, and, at the same time, the necessary strength and firmness may be possessed by the standards.

At the bottom where the endless aprons receive their motions from the driving-wheels B B, a different means of effecting the self-adjustment should be employed; and it is best to have only one of the aprons yield, and adjust its position. To effect this purpose, the journals or journal-boxes of one of the lower rag-wheel shafts, (the forward shaft I as represented,) is allowed a sufficient extent of movement forward and backward in slots I′ I′ formed in the side plates of the frame A, so that the lower part of the endless apron can swing out from or in toward the other apron. It is pressed toward the other apron by springs $I^2$ $I^2$, attached to the frame, and pressing against the shaft I or its journal-boxes. It is pressed outward by the elasticity of the hay or straw, according to the quantity thereof passing between the aprons.

In order to communicate motion from the driving-wheels to this completely self-adjustable endless apron, a self-extensible connecting-gear on each side of the machine is required. For this purpose I have represented an intermediate transmitting-pinion, F, between a cog-wheel, C, connected with each driving-wheel B, and a pinion, H, on each end of the shaft I, it being mounted in the adjacent ends of two connecting-arms E and G, the other ends of which are pivoted respectively on the driving-wheel journal or shaft and on the shaft I. The two arms together are longer than the distance between the said journal and shaft, enough to allow the required extension, so that they form an angle at their junction where the intermediate pinion G has its bearings, thus bringing the said pinion above the direct line between the axes of the cog-wheel C and the pinion H. Hence, as the latter approaches or recedes from the former, the intermediate pinion plays up and down with its bearing arms, and continually remains in gear with both of them.

Each cog-wheel C turns on the journal or shaft D of its driving-wheel B, and is coupled to the said driving-wheel by a ratchet-wheel and pawl. The ratchet-wheel is shown in fig. 2, as internal, so that the pawl and its spring, attached to the driving-wheel, are inclosed in the depression inside of the ratchet-teeth.

The arrangement of the ratchet-wheel and pawl is such that the cog-wheel is turned only when the driving-wheel is moving forward; and, therefore, the endless apron moves whenever either of the driving-wheels is in motion forward, so that if there is any progression of the machine, either straight forward or turning, the hay or grain is taken up and continues to be elevated or conveyed.

The pinion K on each end of the rag-wheel shaft L of the other endless apron, matches immediately into the adjacent cog-wheel C, there being no adjusting movement of the apron at the bottom. These pinions K K are of the same size as the pinions H H on the shaft I, so that the two endless aprons may move at equal speeds.

The direct gearing to the rear apron, and the intermediate gearing to the front apron, produce the respective movements thereof in the desired directions.

As the endless aprons deliver the hay or grain at the top, it is directed forward, so as to fall upon the cart or wagon by suitable discharging-boards or guides $T^1$ $T^2$ or their equivalents. They are represented as curving forward, being attached to the upper curved ends of the standards T T.

I have represented in the drawings, and originally described an additional device for gathering up the hay from the ground, and for the endless aprons to take it up therefrom. I find by further experience, however, that unless the hay is very short, the endless aprons take it up entirely from the ground, without any assistant means, and that such additional device is ordinarily unnecessary, and would add to the expense of the machine, as well as make it cumbersome and liable to disarrangement, therefore I prefer to dispense with it.

It is to be understood that the two co-operating endless aprons not only perform the function of elevating or conveying the hay or grain between them, but also the important additional function of taking up or "picking up," the same from the ground without assistant means.

It should also be clearly understood that the two aprons, each having its own positive motion, and both moving together, and at equal or nearly equal speeds, differ entirely from a device wherein one apron carries the substance, and a counter-apron or surface, having either an irregular motion, dependent on the movement of the substance itself, or no movement at all, merely serves to keep the substance in place upon the carrier.

What I claim as my invention, and desire to secure by Letters Patent, is—

The combination, in a hay-loading machine, of two positively-actuated endless aprons without teeth or projections on their adjacent surfaces, arranged together and co-operating, so that both aprons take up the hay or grain from the ground, and elevate or convey it to the cart or wagon, substantially as herein specified.

Also, the elastic standards T T, for producing the self-adjusting movement of the endless aprons toward and from each other, substantially as and for the purpose herein specified.

Also, in combination with two endless aprons thus positively acting together and self-adjustable, one toward and from the other, an extensible gear, for transmitting motion from the driving-wheels to the self-adjustable apron, substantially as specified.

Also, in combination with the two endless aprons thus positively acting together, the delivery-boards or guides, arranged as described, for directing the hay or grain to the cart or wagon, substantially as herein specified.

The specification of my improved machine for raking and loading hay signed by me this 10th day of May, 1869.

HORACE BAKER.

Witnesses:

CHS. THO. WHITE,

T. A. CHAMBERLAIN.